UNITED STATES PATENT OFFICE.

GEORGE L. W. PALMER, OF ROXBURY, MASSACHUSETTS.

PROJECTING APPARATUS.

1,215,975.  Specification of Letters Patent.  Patented Feb. 13, 1917.

Application filed December 10, 1915. Serial No. 66,198.

*To all whom it may concern:*

Be it known that I, GEORGE L. W. PALMER, a citizen of the United States, residing at Roxbury, in the county of Suffolk and State of Massachusetts, have invented new and useful Improvements in Projecting Apparatus, of which the following is a specification.

This invention relates to improvements in projecting apparatus, and has for its object to provide an apparatus constructed and arranged to automatically project images from a predetermined number of transparencies upon a screen and to automatically repeat the exhibition as long as the apparatus is permitted to operate.

Another object of the invention is to progressively advance a series of transparency holders into a predetermined position with respect to the lenses which project the images from said transparencies upon the screen, said apparatus being also adapted to accurately position the several transparencies carried by each of said holders in their proper relation with respect to the luminous rays directed through said lenses.

Still another object of the invention is to provide means for automatically operating the instrumentalities for producing the luminous rays during the movements of said transparencies, to turn on and shut off said rays.

The invention consists in the combination and arrangement of parts and also in other objects and improvements which will appear in the following specification and are particularly pointed out in the claims.

Referring to the drawings.

Like numerals refer to like parts throughout the several views of the drawings.

In the drawings, 12 is a frame preferably consisting of a base 13 and upright members 14 and 15 at the forward and rear ends thereof. A set of lenses consisting preferably of a condensing lens 16 and a projecting lens 17 is arranged above the frame 12 and suitably supported in relation thereto, while the relation of said projecting lens with respect to said condensing lens is illustrated in diagrammatic form in Fig. 10.

Figure 10:
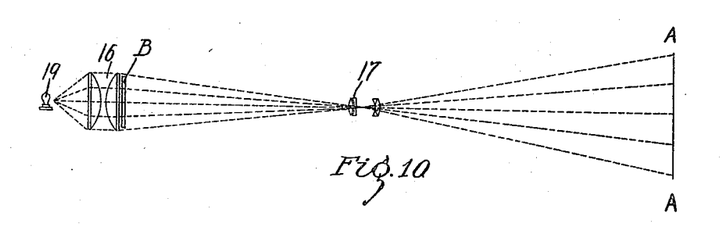
Fig. 10 is a diagrammatic view illustrating the relation of the lenses with respect to the source of light by which the luminous rays are directed through said lenses, dotted lines in said figure representing the direction of the rays with respect to the focal axis of the lenses.

The condensing lens 16 is preferably constructed in accordance with the usual design followed by makers of projecting apparatus and inclosed in a cylindrical casing 18, said casing being arranged above the frame 12 while the projecting lens 17 may be placed at any predetermined distance from said condensing lens to correspond with the position of the screen as indicated by the line A—A in Fig. 10.

The projecting lens 17 as illustrated in Fig. 10 is arranged with its focal axis substantially in alinement with the focal axis of the lens 16, but the position of said lens 17 with relation to the lens 16 may be varied according to the conditions to be met, but by reason of the fact that such conditions and the construction and arrangement of said projecting lens are common to substantially all projecting apparatus, said projecting lens has been omitted from the general views of the drawings.

In this type of apparatus, the transparencies, plates, film or whatever the name and character of the element from which the image is projected is arranged in the usual relation to the condensing lens, namely at the optical center thereof, said optical center being indicated at B, Fig. 10, in close proximity to the end of the casing 18 containing said condensing lens. Instrumentalities are provided for directing luminous rays through said lenses along the focal axis thereof, said instrumentalities preferably, though not essentially, including an incandescent lamp 19 arranged at the rear of and in close proximity to said condensing lens, (see Fig. 10).

As hereinbefore stated, one of the objects of the invention is to provide an apparatus constructed and arranged to automatically project images from a predetermined number of transparencies upon the screen, which predetermined number may vary according to the purpose for which the apparatus is to be used. In accomplishing this particular object, a plurality of rotatable members have been provided, said members constituting holders, each of which is adapted to hold a plurality of transparencies while the preferred embodiment of said holders consists of a series of disks 20, 20 arranged side by side to rotate about a common axis.

Figure 5:
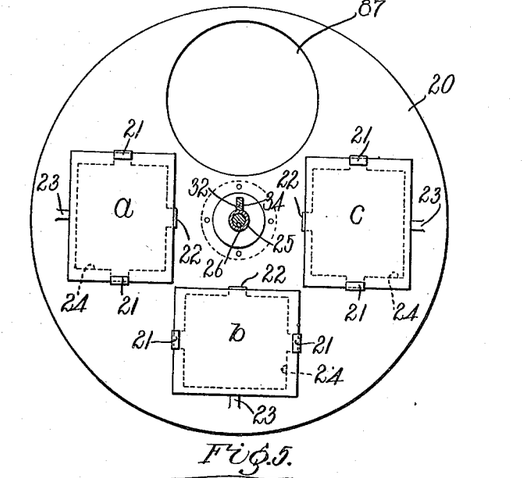
Fig. 5 is a detail front elevation of one of the rotatable members or transparency holders.

In the present embodiment of this feature of invention, each disk is adapted to hold three transparencies indicated at $a$, $b$ and $c$, disposed about and equidistant from the axis of said disk and substantially 90° apart. Each of the transparencies, $a$, $b$ and $c$, are adapted to be positioned in their respective positions by means formed by partially detaching portions of the material constituting the disk 20 which are formed of sheet material, said means consisting of guide members 21 adapted to engage opposite sides of said transparencies, stops 22 adapted to engage the inner edges of said transparencies and resilient detents 23 adapted to spring into place against the outer edges of said transparencies after the same have been placed between the guide members 21 and against the stops 22.

Alining with each of the transparencies is an aperture 24 which extends through said disk and only slightly smaller than said transparencies through which the luminous rays are adapted to pass at the proper time to project the images upon said transparencies upon the screen. The several disks 20 are adapted to rotate in a plane disposed transversely of the focal axis of the lens 16 or in other words about a common axis disposed substantially parallel with said focal axis, the distance of said common axis from said focal axis being substantially equal to the distance between the center of the transparencies and said common axis.

One of the transparencies carried by said holder or disk is adapted to occupy a position alining with the opening through the casing 18 or in other words to be in intercepting relation with respect to the luminous rays passing through said casing, said luminous rays being indicated by the dotted lines in Fig. 10. After the image upon one of said transparencies has been thrown upon the screen for a sufficient length of time, the disk carrying said transparencies is then rotated a portion of the rotation thereof to present the next transparency to said lens, and so on until all of the transparencies on said holder have been exhibited, said disk being rotated automatically by instrumentalities adapted to intermittently move said transparencies into their proper positions successively and to retain the same for a predetermined period in the position intercepting said luminous rays, said instrumentalities being hereinafter more fully described.

After all the transparencies carried by one of said holders have been exhibited, said holder is adapted to be advanced and the next holder in said set moved into the position occupied by the holder which previously occupied the predetermined position or optical center with respect to said lens and this operation is repeated until each of said holders have been moved to said position and the entire set or number of transparencies have been thrown upon the screen.

A second feature of this invention is to automatically return the entire set of holders or disks to its initial starting position whereupon the display of the transparencies carried thereby may be repeated in the same order as before. To accomplish the results just described, each of the disks 20 is mounted upon a sleeve 25, encircling a shaft 26 and constituting bearings for said shaft. The sleeve 25 is preferably interrupted at 27, thus separating said sleeve into two parts 28 and 29. The part 28 is secured at its outer end in a block 30 fast to the upright member 14 while the opposite end of said sleeve is made fast to a block 31 secured to the upright member 15, said sleeve members being prevented by said blocks from rotating with the shaft 26.

Means preferably consisting of a key 32 is secured longitudinally of said sleeve 25 and is interrupted to correspond with the interruption 27 of the sleeve. This interruption is substantially equal in width to the thickness of one of said disks 20 and is placed in a position to correspond with the optical center of the lens 16. A collar 33 is secured to the shaft 26 between the ends of the members 28 and 29 of said sleeve and constitutes a continuation of said sleeve, it being of an equal diameter therewith.

The key 32 is arranged to interlock with the disks 20 in notches 34 formed in said disks and when said key is in interlocking relation with said disks, said disks will be prevented from rotating about said sleeve or about said shaft but will be permitted to move longitudinally of said sleeve. The shaft 26 is also provided with a tooth 35 substantially corresponding in shape to the cross section of the key 32 and arranged to aline with said key at predetermined periods in the operation of the machine, said tooth being also arranged to interlock with the disks one at a time, as said disks are moved across the interruption or gap 27 formed in said key 32.

The instrumentalities which are constructed and arranged to move the plurality of disks longitudinally of the sleeve or longitudinally with respect to the focal axis of the lens 16 to move said disks successively into and out of the optical center of said lens preferably consists of a carrier 36 provided with uprights 37 and 38 arranged to encircle the sleeve 25 at the front and rear respectively of said plurality of disks. The uprights 37 and 38 are connected together at their lower ends, preferably by a rectangular frame 39 provided with rollers 40 adapted to roll along a bed plate 41 constituting a part of the frame 12.

The upper ends of the uprights 37 and 38 are tied together by a second frame 42 which preferably extends around said plurality of disks. The carrier 36 is arranged to be moved toward the lens 16 as hereinbefore stated, intermittently, preferably by means of a rack 43 pivoted at 44 to said carrier and having slidable engagement with the upright member 15 of said frame, said rack having a series of pins 45 constituting teeth arranged to engage a cam block 46 secured to a rotating member preferably a gear 47 which, in turn, is arranged to rotate upon a stud 48 in the upright member 15. The teeth of the gear 47 are arranged to mesh with the teeth of a pinion 49 fast to a shaft 50 journaled to rotate in bearings 51 formed upon the upright members 14 and 15.

The shaft 50 has a rotary motion imparted thereto from a driving shaft 52 through a gear 53 fast to said shaft 50 and meshing with a pinion 54 fast to said driving shaft. The driving shaft 52 is journaled to rotate in bearings 55 and 56 formed in brackets mounted upon the frame 12, said driving shaft having a rotary motion imparted thereto by any suitable operating instrumentalities such as an electric motor, a portion of which is indicated at 57. The proportions of the several gears hereinbefore referred to may be varied according to the speed required to cause the several steps to occur at the exact moment in relation to the operations of other parts of the apparatus.

The number of pins 45 on the rack 43 preferably correspond with the number of disks in the series which number may be varied as desired. After the last disk in the series, namely disk $d$, has been moved into the position which said disks must occupy in order that the luminous rays may project a clear image therefrom upon the screen, instrumentalities are provided which are rendered operative by the advance of the carrier 36 to a predetermined point, to return said carrier to its initial or starting position, wherein the first disk $e$ of the series may be moved into the position where the images of the transparencies carried thereby will be clearly projected upon said screen, said position being indicated at B.

To accomplish said return movement of the carrier 36 a worm 58 is provided, preferably upon a shaft 59 journaled to rotate in bearings 60 formed in portions of the frame 12. The shaft 59 is rotated continuously during the operation of the apparatus by a pinion 61 which meshes with a gear 62 fast to the driving shaft 52. Arranged in close proximity to the worm 58 and slidable transversely of the axis thereof is a slide 63 carried by brackets 64 depending from the carrier 36. A tooth 65 on said slide 63 is adapted to be moved into and out of engagement with said threads preferably by a spring 66 encircling said slide and engaging a collar 67 fast thereto the opposite end of said spring engaging a stationary arm 68 depending from said carrier.

One end of the slide 63 is arranged to be moved along adjacent to the groove 69 preferably formed in a portion of the frame 12. The groove 69 has two outlets 70 and 71. The outlet 70 is positioned at a predetermined point in the length of said groove 69 which corresponds with the forward limit of movement of said carrier, while the other outlet 71 corresponds with the initial or starting point of said carrier, said outlets being arranged to receive a projection 72 on said slide. An actuating arm 73 is adjustably secured to a rocker shaft 74 arranged to be periodically rocked preferably by means of a pin 75 carried by the gear 47 which during the rotation of said gear is arranged to contact with a finger 76 secured to said rocker shaft 74.

Figure 8:
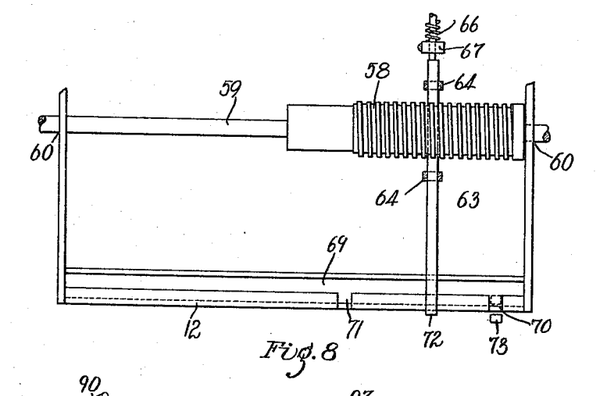
Fig. 8 is a detail plan section taken substantially on the line 8—8 of Fig. 6 and illustrating the instrumentalities adapted to automatically operate the carrier to return it to its initial position.

The lower end of the actuating arm is preferably adapted to aline with the outlet 70 of the groove 69 and as the slide 63 is moved along said groove and its projection 72 reaches a position alining with the outlet 70 and the actuating arm 73, the movement of said actuating arm inwardly from the position shown in full lines, Fig. 8, to that shown in dotted lines of said figure which is caused by the pin 75 engaging the finger 76 and causing the slide 63 to be moved transversely of the worm to compress the spring and move the tooth 65 thereof into the groove of the worm 58, and as said worm is continuously rotated, the carrier will be moved rearwardly by said worm to its initial position until the projection 72 alines with the outlet 71 whereupon the spring 66 will cause said projection to escape from the groove 69 within which said projection has been held during the return movement of the carrier.

The instrumentalities hereinbefore referred to for intermittently rotating the disk occupying the position corresponding with the optical center of the lens preferably consist of a set of intermittent gears 77 commonly known as Geneva gears. The driven member 78 of said set of gears is provided, in the present instance, with four radial slots 79 adapted to receive a pin 80 on the driving member 81 of said set. The portions of said driven member alternating with said slots are concaved at 82 to correspond with the periphery 83 of the driving member 81 said periphery being interrupted by a recess 84 adjacent to the pinion 80 for the purpose of providing clearance for the portions of said driven member surrounding the slots 79 when said driven member is being rotated by said pin.

During the remaining portion of the rotation of the driving member 81, said driven member is held stationary by the concaved portions thereof contacting with the peripheral portion 83 of said member 81. The number of the slots 79 may be varied according to the number of transparencies carried by the disks 20. The driven member 78 is attached to the shaft 26 while the driving member 81 is mounted to rotate preferably upon a fixed stud 85. The driving member 81 has secured thereto a spur gear 86 adapted to mesh with the gear 53 and receive a continuous rotary motion therefrom during the operation of the apparatus. It will be seen by referring to Figs. 1 and 2 that the optical center of the apparatus is directly in front of the casing 18 and as all of the disks 20 must be moved to occupy said position, it is necessary that each of said disks be provided with an opening 87 adapted to receive the cylindrical casing 18 when said disks are moved toward said casing beyond said optical center.

Furthermore, the openings 87 in all of the disks of said set are adapted to aline with each other and said casing 18 during the longitudinal movements of said disks with respect to the focal axis of said lens to move the several disks into the rotatable positions thereof. To accomplish this purpose, the key 32 hereinbefore described is provided and interlocks with the notch 34 which thus positively retains said disks in non-rotatable relation with respect to the sleeve 25 during the entire movements of said disks except during the occupancy of said disks of the position corresponding with said optical center or, in other words, when said disks are in alinement with the interruption in said key.

The opening 87 is placed substantially midway of and in the present case 90° from the nearest apertures 24 of said disks, thus spacing said opening 87 and the apertures 24 uniformly about the axis of said disks.

Figure 9:
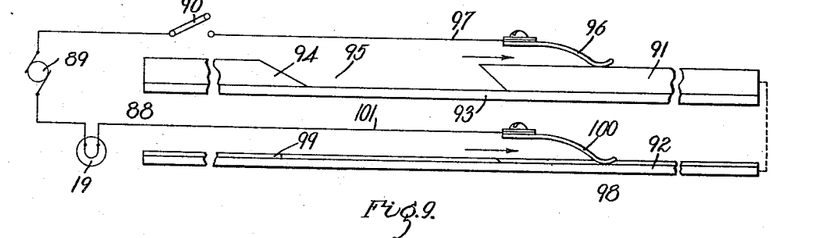
Fig. 9 is a diagrammatic view illustrating the electric circuit for producing the luminous rays, said electric circuit also including the two make and break devices by means of which said luminous rays are shut off and turned on automatically during the several operations of the apparatus.

Another object of the invention as previously stated, is to provide instrumentalities for automatically shutting off and turning on the luminous rays during the several movements of said transparencies. To accomplish this result an electric circuit 88 has been provided which preferably includes a generator 89, as shown in diagrammatic form Fig. 9, the incandescent lamp 19, switch 90 and two make and break devices 91 and 92. The make and break device 91 preferably consists of a plate 93 constructed of fiber or any other suitable insulating material to which is attached preferably a brass plate 94 having a segmental recess 95 adjacent to the outer periphery thereof.

A brush 96 is arranged to yieldingly contact with said brass plate and said fiber plate alternately to make and break the electric circuit including said members. The plates 93 and 94 are connected with the gear 86 and rotated therewith and the recess 95 is so placed with relation to the pin 80 which is carried by said gear 86 as to break the circuit during the periods in which said pin engages the driven member 78, thus no light will be permitted to pass through the lens 16 when the disks are being rotated. The brush 96 is connected by means of a conductor 97 with the electric circuit 88. During the movements of said disks longitudinally with respect to the focal axis of the lens the luminous rays are also adapted to be shut off by means of the make and break device 92 which preferably consists of a brass disk 98 fast to and rotatable with the gear 47.

A segmental plate 99 constructed of insulating material is attached to one face of said disk 98. A brush 100 is adapted to yieldingly engage the face of said disk 98 and the plate 99 alternately during the rotation of the gear 47 and said members to also open and close said electric circuit. The brush 100 is connected by means of a conductor 101 with said electric circuit while the electric circuit including said members is completed through the shaft 48 to which the gears 47 and 86 are secured. The portion of the segmental plate 99 which is adapted to be engaged by the brush 100 is so arranged with relation to the pin 75 carried by the gear 47 that the electric circuit affected by the rotation thereof will be broken during the return movement of the carrier to its initial position and also the step by step forward movement of said carrier to properly position the disks 20 as will be seen by the location of said segmental plate with relation to the pin 75.

The general operation of the apparatus hereinbefore described is as follows:

The electric circuit 88 must first be completed by the switch 90 and the apparatus set into operation.

After the transparencies have been properly positioned in the several disks 20, the disk occupying the position alining with the interruption in the key 32 and also corrsepond ing with the optical center of the lens is then rotated intermittently until all of said transparencies have been moved into intercepting relation with respect to the luminous rays of the apparatus which luminous rays have been shut off during the successive movements of said disks but automatically turned on as said disks arrive into the position alining with the lens in the casing 18.

Figure 1:
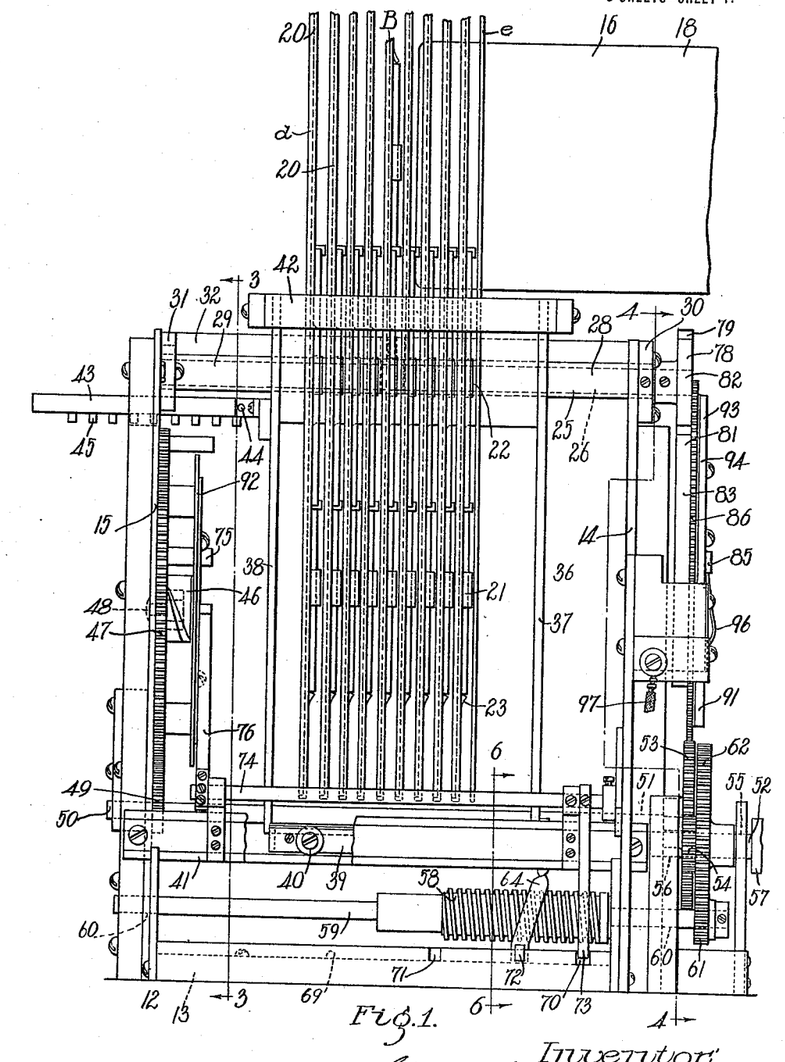
Figure 1 is a right hand side elevation of a projecting apparatus embodying my invention, portions of said apparatus being broken away and parts removed to save space in the drawings.
Figure 2:
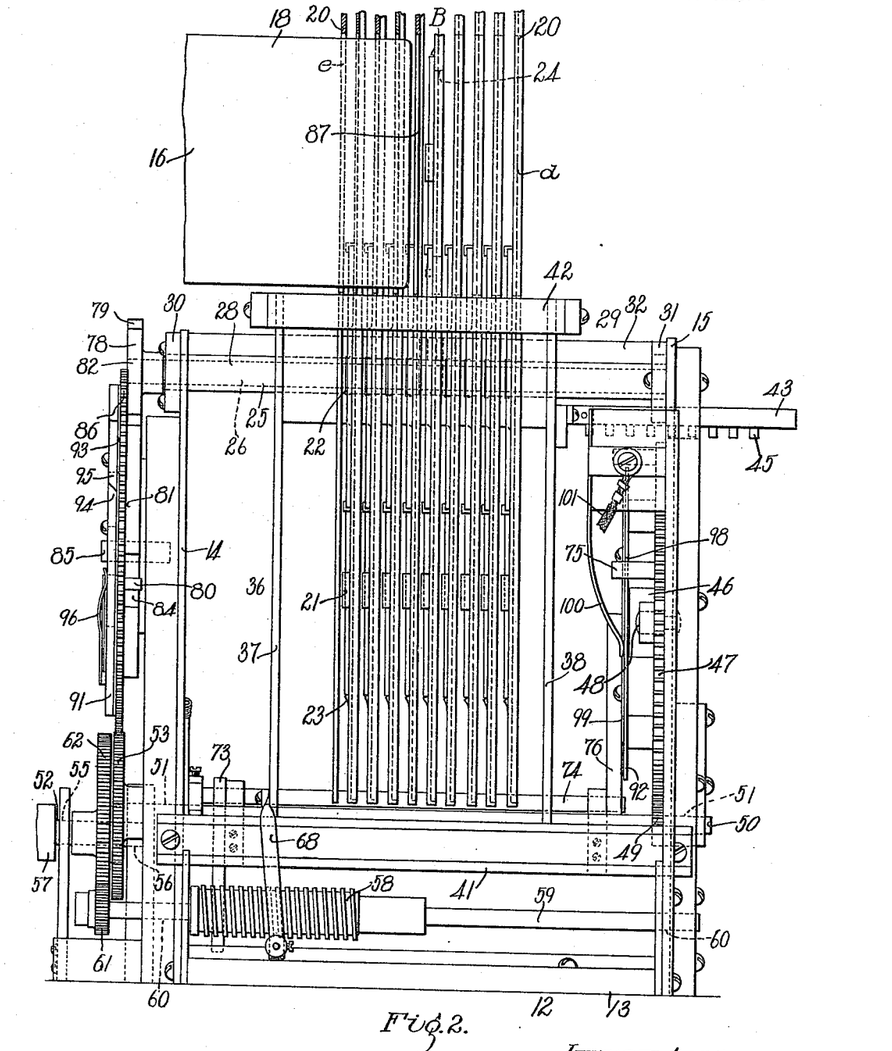
Fig. 2 is a left hand side elevation of the apparatus.
Figure 3:
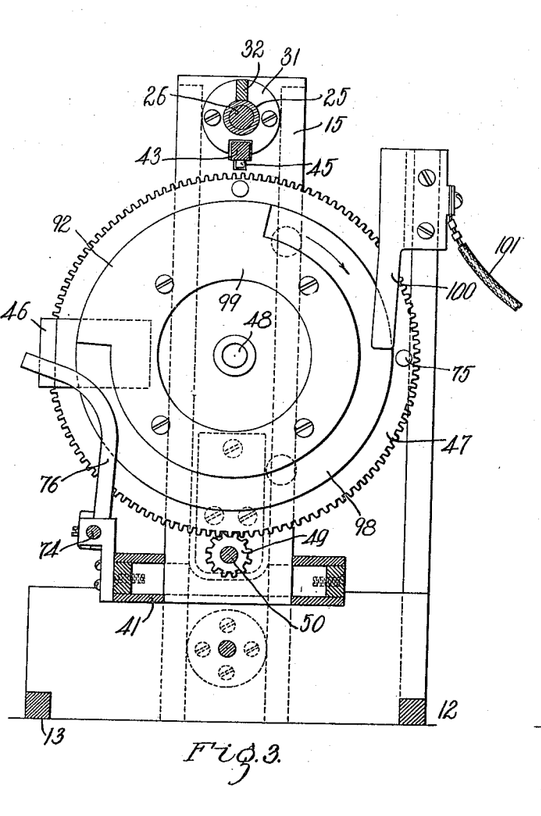
Fig. 3 is a transverse section through the apparatus, taken on the line 3—3 of Fig. 1.
Figure 4:
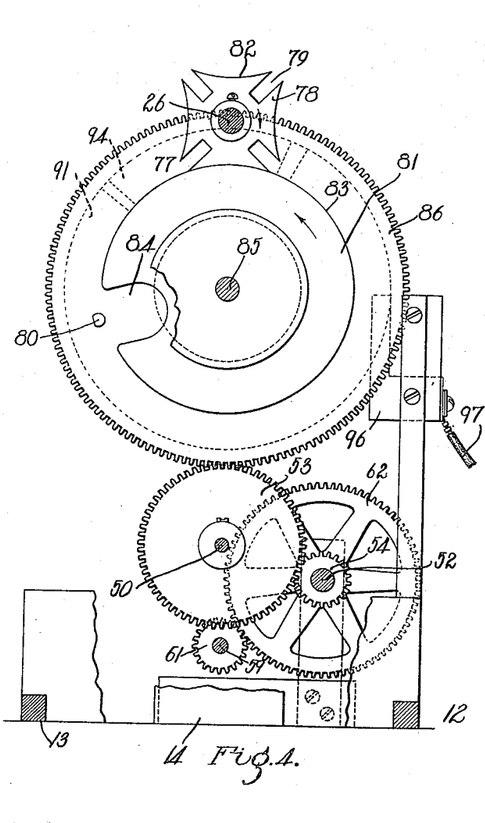
Fig. 4 is a section taken substantially on the irregular line 4—4 of Fig. 1, and viewed in the direction of the arrows on said line.
Figure 6:
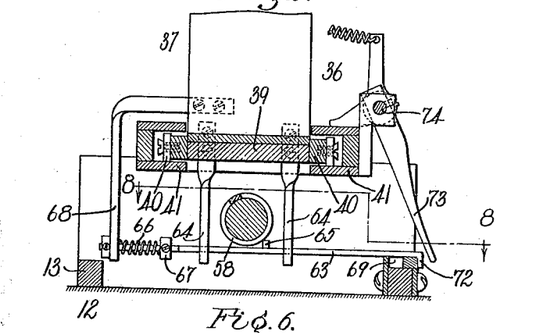
Fig. 6 is a section taken substantially on the line 6—6 of Fig. 1.
Figure 7:
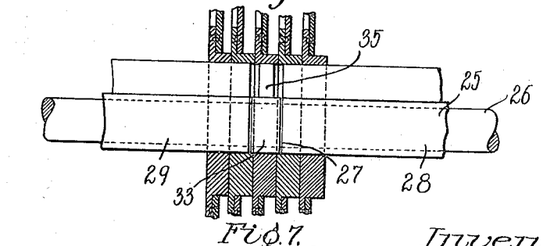
Fig. 7 is a detail view illustrating in section a number of transparency holders arranged upon the supporting member therefor with the means for interlocking with the holder about to be rotated.

The images on said transparencies will then be projected upon the screen for a predetermined period and after all of the transparencies carried by the disk occupying said position, have been exhibited, the mechanism including the rack 43 and cam 46 operates to advance the carrier 38 the distance between two successive disks thus bringing the next disk in the set into position B as illustrated in Figs. 1, 2 and 10 and so on until all these disks have been moved to said position. After all the transparencies have been displayed as stated and the carrier has been moved to its extreme forward position in which position the slide 63 alines with the outlet 70 of the slot 69 and the actuating arm 73, said actuating arm which is periodically rocked by the pin 75 will engage said slide and move the same back toward the left in Fig. 6 until the tooth 65 engages the threads of the worm 58 which immediately causes the carrier and slide to be returned to its initial position.

During said return movement, the projection 72 is held within the groove 69 after having been moved out of alinement by the outlet 70 by the walls of said groove until said slide reaches a position alining with the outlet 71 whereupon the spring 66 will be permitted to expand and remove the tooth 65 from its engagement with said worm and thereby stop the movement of said carrier in that direction.

During the operations of the instrumentalities just described the make and break devices 91 and 92 are automatically operated to shut off the luminous rays during all of the movements of the transparencies, and turned on at the proper time to display images upon said transparencies.

While I have herein shown and described one specific embodiment of my invention for illustrative purposes and have disclosed and discussed in detail the construction and arrangement of parts incidental to the specific application thereof, it is to be understood that the invention is limited, neither to the mere details or relative arrangement of parts, nor to the specific application herein shown, but that extensive alterations may be made in the illustrated form and embodiment of the invention without departing from the principle thereof.

Having thus described my invention what I claim and desire by Letters Patent to secure is:

1. A projecting apparatus having, in combination, a lens, instrumentalities for directing luminous rays through said lens, a plurality of parallelly disposed rotatable members arranged transversely of the focal axis of said lens each of said rotatable members being adapted to hold a plurality of transparencies, instrumentalities adapted to move said rotatable members into predetermined positions with respect to the optical center of said lens and instrumentalities constructed and arranged to rotate the rotatable member occupying said predetermined position to successively move the transparencies carried thereby substantially into alinement with the focal axis of said lens and in intercepting relation with respect to said luminous rays.

2. A projecting apparatus having, in combination, a set of lenses having a common focal axis, a carrier arranged to move longitudinally of said focal axis, a plurality of rotatable members mounted on said carrier between the lenses constituting said set, each of said rotatable members being constructed and arranged to hold a plurality of transparencies, instrumentalities adapted to move said carrier longitudinally of said focal axis to successively move said rotatable members into a predetermined position with respect to said lenses, and instrumentalities adapted to automatically rotate each of said rotatable members when said members occupy said predetermined position, to move the transparencies carried by said rotatable members substantially into alinement with the focal axis of said lenses.

3. A projecting apparatus having, in combination, a condensing lens, a projecting lens, instrumentalities for directing luminous rays through said condensing and projecting lenses, a plurality of rotatable members arranged in parallel relation to each other intermediate of said condensing lens and said projecting lens, each of said rotatable members being provided with a series of apertures disposed about the axis thereof and adapted to substantially aline respectively with the focal axis of said lenses, means for holding transparencies in alinement with the apertures in each of said rotatable members, instrumentalities adapted to move said rotatable members longitudinally of the focal axis of said lenses into a predetermined position with respect to said condensing lens and instrumentalities constructed and arranged to intermittently rotate said rotatable members during their occupancy of said predetermined position.

4. A projecting apparatus having, in combination, a condensing lens, instrumentalities for directing luminous rays through said lens, a series of holders parallelly disposed about a common axis arranged substantially parallel with the focal axis of said lens, a plurality of transparencies disposed about the axis of each of said holders, a stationary support for said holders, a key extending longitudinally of said support adapted to interlock with said holders and to prevent the rotation thereof on said support, said key being interrupted at a predetermined distance from said condensing lens, instrumentalities adapted to move said holders intermittently along said support into a position alining with the interruption in said key and instrumentalities constructed and arranged to intermittently rotate said holders during the alinement thereof with the interruption in said key to move the transparencies carried thereby into intercepting relation with respect to said luminous rays.

5. A projecting apparatus having, in combination, a condensing lens, instrumentalities for directing luminous rays through said lens, a series of holders parallelly disposed to rotate about a common axis, a support for said holders, a key extending longitudinally of said support adapted to interlock with said holders and to prevent the rotation thereof on said support, said key being interrupted at a predetermined distance from said condensing lens, instrumentalities adapted to move said holders intermittently along said support into a position alining with the interruption in said key, instrumentalities constructed and arranged to intermittently rotate said holders during the alinement thereof with the interruption in said key to move the transparencies carried thereby into intercepting relation with respect to said luminous rays, and mechanism constructed and arranged to automatically return all of said holders to their initial positions, with respect to the optical center of said lens.

6. A projecting apparatus having, in combination, a shaft, means for imparting to said shaft an intermittent rotary motion, a plurality of transparency holders movable longitudinally of said shaft, means on said shaft adapted to interlock with said transparency holders one at a time to impart rotary motion thereto and instrumentalities constructed and arranged to advance said plurality of transparency holders along said shaft successively into engagement with said interlocking means.

7. A projecting apparatus having, in combination, a shaft, means for imparting to said shaft an intermittent rotary motion, a plurality of transparency holders movable longitudinally of said shaft, means on said shaft adapted to interlock with said transparency holders one at a time to impart rotary motion thereto, instrumentalities constructed and arranged to advance said plurality of transparency holders along said shaft successively into engagement with said interlocking means, and means constructed and arranged to prevent the rotation of the transparency holders on said shaft which are not engaged by said interlocking means.

8. A projecting apparatus having, in combination, a shaft, means for imparting to said shaft an intermittent rotary motion, a plurality of transparency holders arranged side by side about said shaft and movable longitudinally thereof, means extending longitudinally of said shaft constructed and arranged to interlock with said transparency holders and prevent the rotation thereof, relatively to said shaft, said means having an interruption in its length substantially equal in width to the space between two adjacent transparency holders, instrumentalities constructed and arranged to advance said transparency holders longitudinally of said shaft to register with said interruption and means connected with said shaft adapted to interlock with the transparency holder registering with said interruption adapted to rotate the holder interlocking therewith simultaneously with said shaft.

9. A projecting apparatus having, in combination, a shaft, means for imparting to said shaft an intermittent rotary motion, a sleeve encircling said shaft, means for holding said sleeve stationary with respect to said shaft, a plurality of transparency holders mounted upon said sleeve in close proximity to each other, a key extending longitudinally of said sleeve for a portion of the length thereof adapted to interlock with said transparency holders and prevent the rotation of said holder with respect to said sleeve, instrumentalities constructed and arranged to advance said transparency holders intermittently along said sleeve toward the end of said key and means connected with said shaft in close proximity to the end of said key adapted to interlock with said transparency holders as they are advanced from the end of said key to rotate the same with respect to said sleeve.

10. A projecting apparatus having, in combination, a condensing lens, a cylindrical casing for said lens, a plurality of disks arranged to rotate transversely of the focal axis of said lens each of said disks having an opening extending therethrough adapted to aline with and receive said cylindrical casing, each of said disks also being provided with a plurality of apertures arranged about and equidistant from the axis thereof, means for holding transparencies in alinement with said apertures, means adapted to normally retain the openings in said plurality of disks normally in alinement with said lens casing, instrumentalities constructed and arranged to move said disks intermittently along the axis of said plurality of disks successively to the optical center of said lens and over the end of said casing, and instrumentalities constructed and arranged to operatively engage the disk located at said optical center to rotate said disk and successively move the transparencies carried thereby into a position substantially alining with the focal axis of said lens.

11. A projecting apparatus having, in combination, a condensing lens, a plurality of disks arranged in close proximity to each other to rotate about a common axis extending substantially parallel with the focal axis of said lens, each of said disks having a plurality of apertures disposed about the axis thereof and substantially equidistant from said axis, means for positioning transparencies in alinement with each of said apertures, a carrier for said plurality of disks, a rack attached to said carrier, means to impart a step by step movement to said carrier to move said plurality of disks longitudinally with respect to the focal axis of said lens successively into a position in front of and in close proximity to said condensing lens, instrumentalities constructed and arranged to rotate the disk occupying said last named position and means to prevent the rotation of the others of said disks.

12. A projecting apparatus having, in combination, a condensing lens, a series of rotatable members each constructed and arranged to hold a plurality of transparencies and arranged to rotate about an axis substantially parallel with the focal axis of said lens, a carrier for said series of rotatable members, instrumentalities constructed and arranged to impart a step by step movement to said carrier longitudinally of the focal axis of said lens to successively move said rotatable holders into a predetermined position with respect to said lens, instrumentalities adapted to automatically rotate each of said rotatable members while said holders are occupying said predetermined position and means rendered operative by the movement of said carrier a predetermined distance adapted to return said carrier to its initial position with respect to said lens.

13. A projecting apparatus having, in combination, a condensing lens, a plurality of rotatable members arranged in close proximity to each other adapted to rotate about a common axis arranged substantially parallel with the axis of said lens, a carrier adapted to move said rotatable members simultaneously longitudinally of said common axis to successively move said rotatable members into a predetermined position with respect to said lens, instrumentalities adapted to rotate each of said rotatable members during the occupancy thereof of said predetermined position, a rack connected with said carrier, a rotating member adapted to intermittently engage said rack and move said rotatable members successively toward said lens into said predetermined position, a revolving worm, a slide mounted on said carrier, a tooth on said slide adapted to be moved into engagement with said worm, means for normally retaining said tooth out of engagement with said worm, an actuating arm for said slide adapted to engage said slide and move said tooth into engagement with the threads of said worm, means for actuating said arm, instrumentalities adapted to operate said worm to return said carrier to its initial position and means for disconnecting said tooth from said worm when said carrier has arrived at its initial position.

14. A projecting apparatus having, in combination, a shaft, a plurality of transparency holders arranged side by side about said shaft and movable longitudinally thereof, a key arranged longitudinally with respect to said shaft constructed and arranged to interlock with said transparency holders and prevent rotation thereof said key having an interruption in its length substantially equal to the space occupied by one of said transparency holders, means on said shaft arranged to register with said interruption adapted to interlock with the transparency holder registering with said interruption, said means also being adapted to normally aline with said key, instrumentalities adapted to intermittently rotate said shaft and the holder interlocking therewith and instrumentalities constructed and arranged to move said plurality of transparency holders longitudinally of said key to move one of said holders out of alinement with said interruption and the next adjacent holder into alinement therewith during the period that the interlocking member on said shaft is in its normal position and alining with said key.

15. A projecting apparatus having, in combination, a lens, instrumentalities for directing luminous rays through said lens, a plurality of rotatable holders each adapted to hold a plurality of transparencies constructed and arranged to rotate about an axis substantially parallel with the focal axis of said lens, instrumentalities constructed and arranged to move said plurality of holders longitudinally of the focal axis of said lens successively into a predetermined position with respect to said lens, electrical instrumentalities adapted to be automatically operated to shut off said luminous rays during the longitudinal movements of said holders, instrumentalities adapted to intermittently rotate the holder occupying said predetermined position to successively move the transparencies held thereby into intercepting relation with respect to said luminous rays and electrical instrumentalities adapted to automatically operate to shut off the said luminous rays during the rotary movements of said holders.

16. A projecting apparatus having, in combination, a lens, instrumentalities for directing luminous rays through said lens, a plurality of holders each adapted to hold a plurality of transparencies, said holders being arranged side by side to rotate about a common axis extending substantially parallel with the focal axis of said lens, instrumentalities constructed and arranged to impart to said plurality of holders a step by step movement longitudinally of said common axis to move said holders one at a time into a predetermined position with respect to said lens, instrumentalities adapted to intermittently rotate the holder occupying said predetermined position about said axis to successively move the transparencies carried thereby into intercepting relation with respect to said luminous rays and instrumentalities rendered operative by a predetermined movement of said plurality of holders longitudinally of said common axis to return said plurality of holders to their initial positions.

17. An apparatus of the class described having, in combination, a lens, instrumentalities for directing luminous rays through said lens, a plurality of parallelly disposed series of transparencies, instrumentalities constructed and arranged to move each of said series of transparencies successively into a predetermined position with respect to said lens, means adapted to automatically shut off said luminous rays during said movements of said series of transparencies, instrumentalities adapted to revolve the series of transparencies occupying said predetermined position to successively move the transparencies thereof into intercepting relation with respect to said luminous rays, and means adapted to automatically shut off said luminous rays during the last mentioned movements of said transparencies.

In testimony whereof I have hereunto set my hand in presence of two subscribing witnesses.

GEORGE L. W. PALMER.

Witnesses:
 SYDNEY E. TAFT,
 HATTIE E. STRATTON.

Copies of this patent may be obtained for five cents each, by addressing the "Commissioner of Patents, Washington, D. C."